United States Patent
Yamashita

(10) Patent No.: US 6,418,738 B1
(45) Date of Patent: Jul. 16, 2002

(54) AIR CONDITIONER USED IN ELECTRIC VEHICLE

(75) Inventor: Yutaka Yamashita, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 09/932,934

(22) Filed: Aug. 21, 2001

(30) Foreign Application Priority Data

Sep. 7, 2000 (JP) ........................................ 2000-271002

(51) Int. Cl.$^7$ ............................................... F25B 39/04
(52) U.S. Cl. ........................................ 62/183; 62/215
(58) Field of Search .......................... 62/214, 215, 181, 62/183, 184

(56) References Cited

U.S. PATENT DOCUMENTS

| | | | | |
|---|---|---|---|---|
| 3,811,292 A | * | 5/1974 | Hoenisch | 62/181 |
| 4,989,414 A | * | 2/1991 | Murayama et al. | 62/196.3 |
| 5,413,528 A | * | 5/1995 | Pabst et al. | 454/141 |
| 5,568,732 A | * | 10/1996 | Isshiki et al. | 62/129 |
| 5,701,752 A | * | 12/1997 | Tsunokawa et al. | 165/204 |
| 5,771,704 A | * | 6/1998 | Nakajima et al. | 62/228.4 |
| 5,823,004 A | * | 10/1998 | Polley et al. | 62/179 |
| 5,907,957 A | * | 6/1999 | Lee et al. | 62/181 |
| 5,934,397 A | * | 8/1999 | Schaper | 180/294 |
| 5,970,724 A | * | 10/1999 | Weng | 165/900 |
| 6,047,555 A | * | 4/2000 | Weng | 62/171 |
| 6,257,007 B1 | * | 7/2001 | Hartman | 62/183 |

FOREIGN PATENT DOCUMENTS

JP          10115448          5/1998

OTHER PUBLICATIONS

English Language Abstract of JP 10–115448.

* cited by examiner

Primary Examiner—William E. Tapolcai
Assistant Examiner—Mohammad M Ali
(74) Attorney, Agent, or Firm—Greenblum & Bernstein, P.L.C.

(57) ABSTRACT

The present invention aims at providing an air conditioner used in an electric vehicle which can exert a sufficient cooling performance without enlarging the size of a motor for driving a compressor or supplying an excessive amount of driving current to the motor. The air conditioner of the invention is provided with a condenser fan for cooling a condenser and a motor for driving the condenser fan. A driving current Ap of a motor for driving a compressor is detected and compared with respect to reference currents A1 and A2 to select a driving current Vd0 (low voltage), Vd1 (moderate voltage) or Vd2 (high voltage) for controlling the rotation speed of the condenser motor. Since the increase in the load put on the compressor 2 caused by an increase in the temperature of the gas inside the condenser 4 can be suppressed by the cooling effect of the condenser 4 owing to the rotation of the condenser fan, a rotation speed of the compressor necessary to achieve the predetermined temperature can be obtained without providing a high driving current to the motor.

8 Claims, 4 Drawing Sheets

AIR CONDITIONER USED IN ELECTRIC VEHICLE

FIELD OF THE INVENTION

The present invention relates to an improvement of an air conditioner used in electric vehicles.

BACKGROUND OF THE INVENTION

An air conditioner used in electric vehicles is known which cools air by repeating gas compression and expansion in a circulative manner between a condenser and an evaporator via a compressor driven by a motor.

Generally, this type of air conditioner used in electric vehicles achieves a desirable cooling state by determining the rotation speed of the motor for driving the compressor by a controller (e.g., an A/C controller) based on a predetermined temperature set by a temperature setting switch for controlling the air condition, and by driving and controlling the motor to achieve that rotation speed.

However, when the cooling load is large, namely, when the outside air temperature is high where a great force is required for the compressor to compress gas, the load of the motor for driving the compressor is also increased, requiring a great amount of driving current for rotating the motor at the target rotation speed.

Of course, such an overload of the motor can be solved by using a motor with a larger rated current, but still there remains a problem of large current consumption. Specially for electric vehicles, this may deteriorate the running performance of the vehicle itself.

In addition, a large motor will also cause an increase in the cost for producing the vehicle.

In order to solve the above-mentioned problems, conventional air conditioners detect load on the compressor (i.e., detect a driving current of the motor for driving the compressor). When this value exceeds a predetermined value and an excessive amount of load is put on the motor, the target rotation speed of the motor is forcibly reduced, thereby preventing an excessive amount of current to be supplied to the motor to prevent excessive electric consumption and damage on the motor.

As a result, the compressor can no longer exert a rotation speed sufficient to maintain the desired cooling performance and thus results in a significant loss of cooling power of the air conditioner under a high temperature environment.

Thus, the present invention has an objective of solving the above-described problems to provide an air conditioner used in electric vehicles which can exert sufficient cooling performance without enlarging the size of the motor for driving the compressor or supplying an excessive amount of driving current to the motor for driving the compressor.

SUMMARY OF THE INVENTION

The present invention is an air conditioner used in an electric vehicle which cools air by repeating compression and expansion of gas in a circulative manner between a condenser and an evaporator via a compressor driven by a motor. In order to achieve the above-described objective, the air conditioner of the invention comprises: a condenser fan for cooling the condenser; a motor for driving the condenser fan; a load detector for detecting a load put on the compressor; and a rotation speed controller which increases the rotation speed of the motor for driving the condenser fan when the amount of the load detected by the load detector is relatively large, and decreases the rotation speed of the motor for driving the condenser fan when the amount of the load detected by the load detector is relatively small.

Due to this configuration, the rotation speed of the motor for the condenser fan will automatically be increased when the load put on the compressor becomes high in order to cool the condenser by the rotation of the condenser fan. Accordingly, the temperature of the gas inside the condenser is decreased and the load put on the compressor for compressing the gas as well as the load of the motor for driving the compressor are lightened. A rotation speed of the compressor necessary to achieve the temperature set for that time point can be obtained without supplying a high driving current to the compressor motor. Therefore, a sufficient cooling performance can be exerted without enlarging the size of the compressor motor or supplying an excessive amount of driving current to the same. Since the compressor motor is not damaged or the running performance of the electric vehicle is not deteriorated, comfort cooling is realized.

The load detector may comprise a current detector for detecting a driving current of the motor for driving the compressor, and the rotation speed controller may comprise a voltage adjuster for adjusting a voltage supplied to the motor for driving the condenser fan.

Since the driving current of the compressor motor is proportional to the load put on the compressor motor, the load put on the compressor can be determined by detecting the driving current. The rotation speed of the motor for driving the condenser fan can easily be controlled by adjusting the voltage applied to the motor for the condenser fan.

Preferably, the rotation speed controller judges the amount of load put on the compressor based on a reference current for judging the amount of load put on the compressor, and gives a command to the voltage adjuster to output a relatively high voltage when the driving current detected by the current detector is higher than the reference current or to output a relatively low voltage when the driving current detected by the current detector is lower than the reference current.

Due to this configuration, the voltage applied to the motor for the condenser fan is increased to increase the rotation speed of the condenser fan when the load put on the compressor becomes high and the driving current detected by the current detector becomes higher than the reference current. Accordingly, the temperature of the gas inside the condenser is reduced, and thus the load put on the compressor for compressing the gas as well as the load of the motor driving the compressor are lightened. Thus, the target rotation speed of the compressor motor necessary at that time point can be achieved without supplying an excessive amount of current to the compressor motor. On the other hand, the voltage applied to the motor for the condenser fan is reduced to decrease the rotation speed of the condenser fan when the load put on the compressor is low and the driving current detected by the current detector is lower than the reference current. As a result, useless electric consumption due to the motor for driving the condenser fan can be suppressed.

The rotation speed controller may store a plurality of different reference currents for judging the amount of load put on the compressor and a plurality of output voltages corresponding to current ranges separated by each of the reference currents, and may output a voltage corresponding to the current range that includes the driving current detected by the current detector.

In this case, the condenser fan can be driven at an appropriate rotation speed according to the load put on the compressor (i.e., the amount of the driving current of the compressor motor). Accordingly, the motor for driving the condenser fan is driven at a minimum rotation speed necessary at that time point. Thus, the rotation speed is optimized and needless electric consumption by the motor for driving the condenser fan can be prevented.

The output voltage corresponding to the current range separated by each of the reference currents may be 0 at minimum. In other words, the motor for the condenser fan may completely be halted where the load put on the compressor is significantly low.

DETAILED DESCRIPTION OF THE INVENTION

Figure 1:
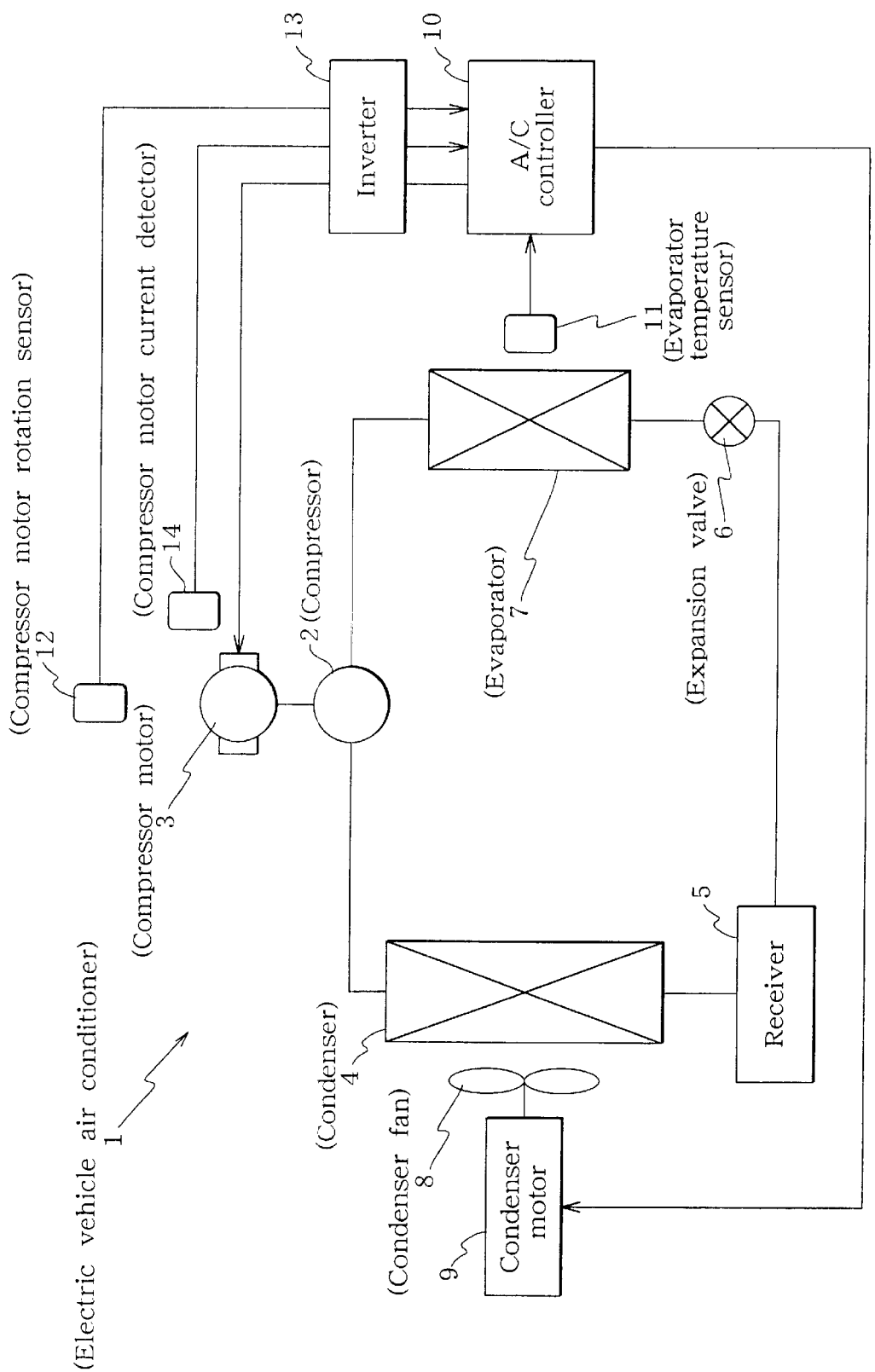
FIG. 1 is a block diagram showing a configuration of a hardware of an electric vehicle air conditioner according to one embodiment of the present invention.

Hereinafter, an embodiment of the present invention will be described with reference to the drawings. FIG. 1 is a block diagram showing a configuration of a hardware of an air conditioner used in an electric vehicle according to one embodiment of the present invention.

As shown in FIG. 1, the electric vehicle air conditioner 1 is provided with: a compressor motor 3 for driving a compressor 2; a condenser 4 for pooling the gas compressed by the compressor 2; a receiver 5 for intermediating the compressed gas sent out from the condenser 4; an expansion valve 6 for expanding the compressed gas sent out from the receiver 5; and an evaporator 7 for taking away the surrounding heat by utilizing the volume expansion of the compressed gas to exert a cooling effect.

A condenser fan 8 for cooling the condenser 4 is rotationally driven by a condenser motor 9. The condenser fan 8 and the condenser motor 9 are components unique to the present embodiment.

An A/C controller 10 for driving and/or controlling the above-mentioned components is provided with a CPU and a memory such as a ROM/RAM required for arithmetic processing. The A/C controller 10 determines a gas compression efficiency necessary for the compressor 2 at that time point (specifically, a target rotation speed Rx of the compressor motor 3 for driving the compressor 2) based on a deviation between a predetermined temperature Ts set by an air conditioner temperature setting switch (not shown) provided on an instrumental panel or the like in the vehicle and a present evaporator temperature Te detected by an evaporator temperature sensor 11. The A/C controller 10 also reads the present rotation speed Rn output from a compressor motor rotation sensor 12, adjusts a duty ratio of an inverter 13 based on a deviation between the present rotation speed Rn and the target rotation speed Rx, and controls a substantial driving current Ap supplied to the compressor motor 3 so that the compressor motor 3 can achieve the target rotation speed Rx required at that time point.

In other words, the compressor motor 3 is controlled with priority to its speed while the driving current Ap required for achieving the same target rotation speed differs between the case where a great power is required for the compressor 2 to compress the gas since the outside air temperature is high and the case where the compressor 2 can easily compress the gas since the outside air temperature is low.

The CPU of the A/C controller 10 and the ROM storing the program for controlling the CPU function as a rotation speed controller and a voltage adjuster in the present embodiment.

The CPU as the rotation speed controller and the voltage adjuster adjusts a driving current Ap of the compressor motor 3 input into the CPU via a compressor motor current detector 14 as a current detector (a load detector) and the inverter 13 (i.e., adjusts the supply voltage Vd supplied to the condenser motor 9 for driving the condenser fan 8 according to the amount of load put on the compressor 2) to adjust the rotation speed of the condenser motor 9.

Figure 2:
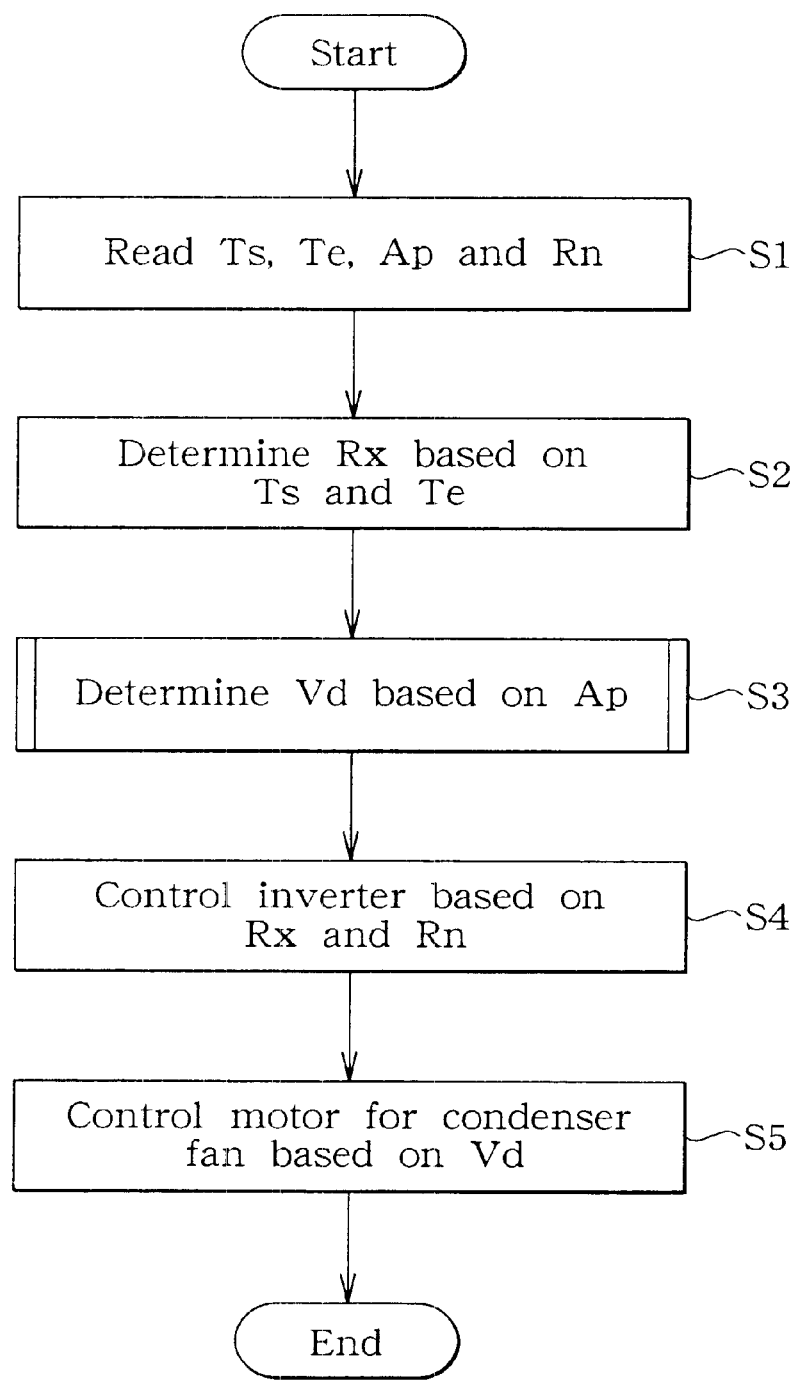
FIG. 2 is a flowchart showing a general outline of motor control processing executed by a CPU of an A/C controller.
Figure 3:
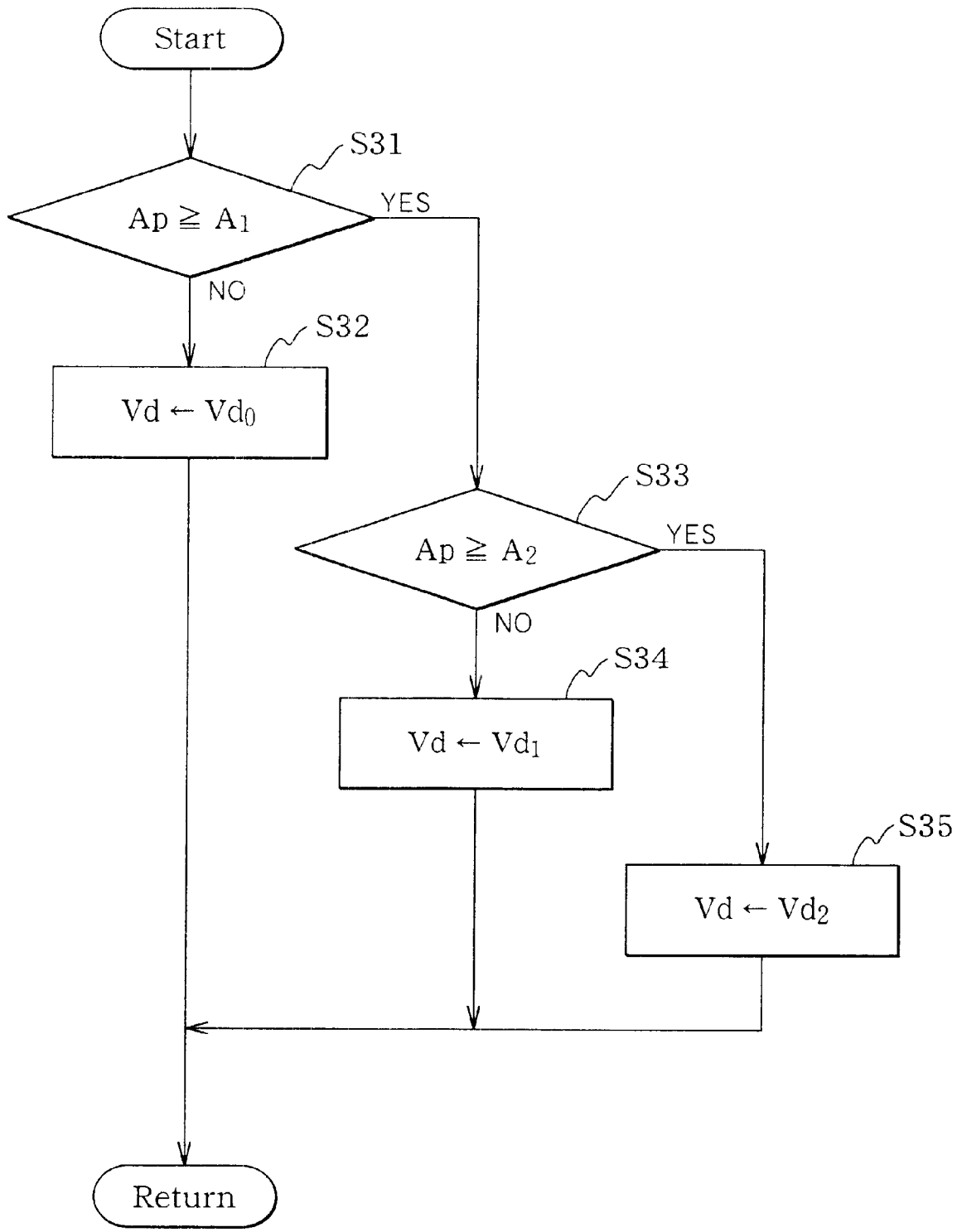
FIG. 3 is a flowchart showing a part of the motor control processing executed by the CPU of the A/C controller.

Hereinafter, the actual processing of the CPU as the rotation speed controller and the voltage adjuster will be described in detail with reference to the flowcharts of FIGS. 2 and 3 showing motor control processing repeatedly executed by the CPU of the A/C controller 10 for every predetermined cycle.

First, the CPU initiates the motor control processing by reading and temporarily storing the predetermined temperature Ts set by the temperature setting switch, a present evaporator temperature Te detected by the evaporator temperature sensor 11, a present driving current Ap of the compressor motor 3 detected by the compressor motor current detector 14, and a present rotation speed Rn output from the compressor motor rotation sensor 12 (Step S1).

Then, the CPU calculates a compression efficiency of gas required for the compressor 2 at that time point, namely, a target rotation speed Rx required for the compressor motor 3 for driving the compressor 2, based on the deviation between the predetermined temperature Ts and the evaporator temperature Te (Step S2). Since this processing in Step S2 is known, description of the details of actual arithmetic processing is omitted.

Then, the CPU as the rotation speed controller and the voltage adjuster calculates a rotation speed of the condenser fan 8 appropriate for the amount of load put on the compressor motor 3 at the present time point (i.e., a supply voltage Vd to be applied to the condenser motor 9) based on the present driving current Ap of the compressor motor 3 temporarily stored in the CPU (i.e., the current detector) in the above-described Step S1 (Step S3). The details of the processing executed in Step S3 is shown in FIG. 3.

As shown in FIG. 3, the CPU as the rotation speed controller first judges whether the driving current Ap of the compressor motor 3 is lower than a first reference current A1 for judging the amount of load put on the compressor 2 (Step S31); if not, the driving current Ap should be between the first reference current A1 and a second reference current A2 or higher than the second reference current A2 (Step S33).

The relationship between the first reference current A1 and the second reference current A2 is A1<A2. Based on these two reference currents, the driving current Ap can be classified into one of three ranges; specifically, a range lower than the first reference current A1, a range between the first and the second reference currents A1 and A2, and a range higher than the second reference current A2.

When the judgment in Step S31 is "no", in other words, when the driving current Ap of the compressor motor 3 which indicates the load put on the compressor 2 is lower than the first reference current A1 and the compressor motor 3 is able to rotate at the target rotation speed Rx with a supply current within the rated current without cooling the condenser 4 with the condenser fan 8 driven by the condenser motor 9, the CPU as the voltage adjuster sets a first output voltage Vd0 corresponding to the current range lower than the first reference current A1 in an output voltage memory register Vd (Step S32).

The value Vd0 is a value for halting the rotation of the condenser motor 9, or a value for rotating the condenser motor 9 at a low speed, which is 0 or an extremely low value.

When the judgment in Step S31 is "yes" and the judgment in Step S33 is "no", in other words, when the driving current Ap of the compressor motor 3 which indicates the load put on the compressor 2 is between the first and second reference currents A1 and A2 and it is judged that the condenser motor 9 for driving the condenser fan 8 should be driven at an appropriate rotation speed to cool the condenser 4, the CPU as the voltage adjuster sets a second output voltage Vd1 corresponding to the current range between the first and second reference currents A1 and A2 in the output voltage memory register Vd (Step S34).

The value Vd1 is a predetermined value for rotating the condenser motor 9 at a low speed, which is higher than the above-described Vd0 and lower than the later-described Vd2.

When the judgments in Steps S31 and S33 are both "yes", in other words, when the driving current Ap of the compressor motor 3 which indicates the load put on the compressor 2 is higher than the second reference current A2 and it is judged that the condenser motor 9 for driving the condenser fan 8 should be rotated at an appropriate rotation speed to forcibly cool the condenser 4, the CPU as the voltage adjuster sets a third output voltage Vd2 corresponding to the current range higher than the second reference current A2 in the output voltage memory register Vd (Step S35).

As described above, the value Vd2 is higher than the above-mentioned values Vd0 and Vd1.

Once the CPU determines the supply voltage Vd to be applied to the condenser motor 9, the CPU calculates a driving current necessary to adjust the rotation speed of the compressor motor 3 to the target rotation speed Rx based on the deviation between the target rotation speed Rx of the compressor motor 3 and the present rotation speed Rn which are temporarily stored in Step S1, and adjust the duty ratio of the inverter 13 such that the determined driving current is output from the inverter 13 (Step S4).

Then, the CPU as the voltage adjuster controls a voltage adjusting unit (not shown) of the A/C controller 10 according to the supply voltage Vd determined in Step S3, and applies the supply voltage Vd to the condenser motor 9 to adjust the rotation speed of the condenser fan 8 (Step S5).

The above-described steps are repeated for predetermined cycles. Accordingly, when the load put on the compressor motor 3 for driving the compressor 2 is low such that the driving current Ap is lower than the first reference current A1, the condenser motor 9 is rotated at a low speed (including a halt state) by the low first output voltage Vd0. When the load put on the compressor motor 3 for driving the compressor 2 is moderate such that the driving current Ap lies between the first reference current A1 and the second reference current A2, the condenser motor 9 is rotated at a moderate speed by the moderate second output voltage Vd1. Furthermore, when the load put on the compressor motor 3 for driving the compressor 2 is high such that the driving current Ap is higher than the second reference current A2, the condenser motor 9 is rotated at a high speed by the high third output voltage Ad2.

Figure 4:
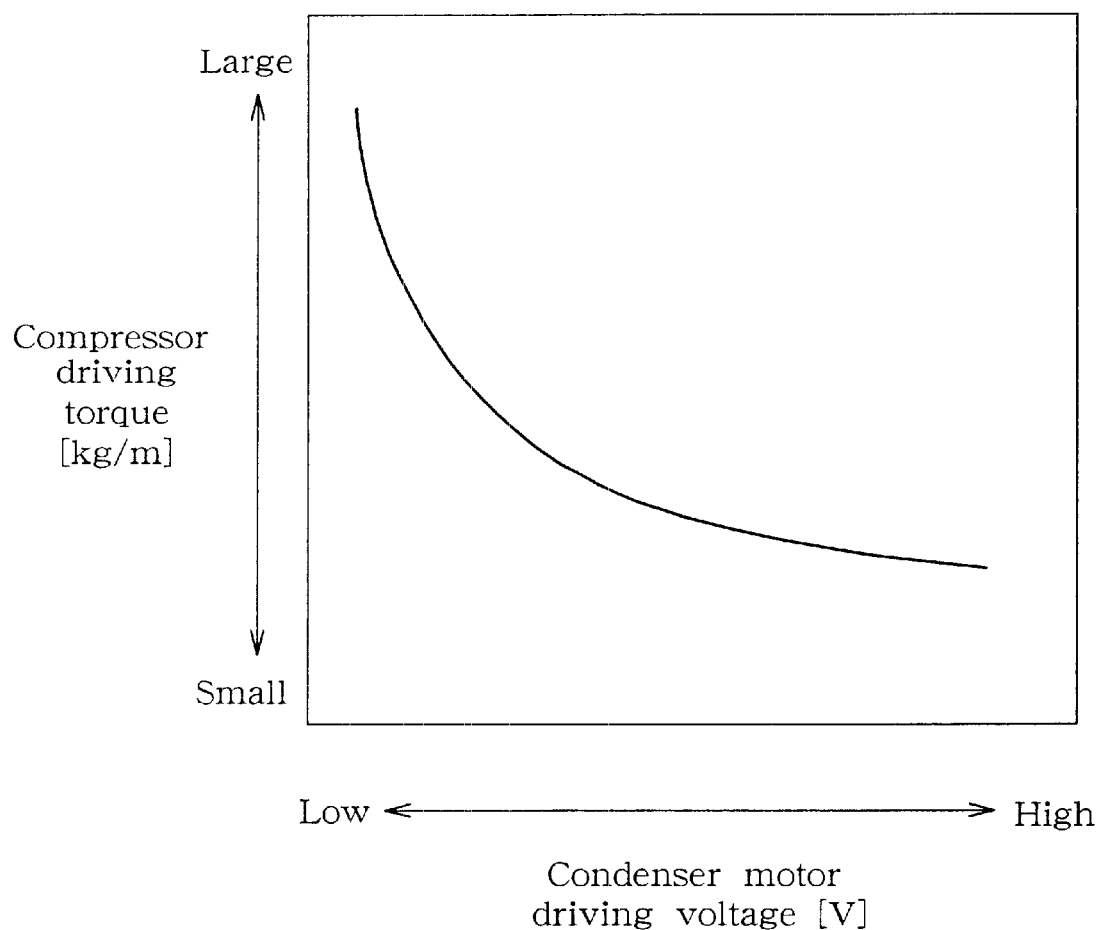
FIG. 4 is a graph showing the relationship between a driving torque required for the compressor motor to achieve a constant rotation speed of the compressor under the same temperature environment and supply voltage supplied to the condenser motor.

FIG. 4 is a graph showing the relationship between a driving torque (=driving current Ap) required for the compressor motor 3 to achieve a constant rotation speed of the compressor 2 when all of the parts except the condenser 4 are under the same temperature environment and the rotation speed (=driving voltage Vd) of the condenser motor 9.

As shown in FIG. 4, for achieving the same rotation speed under the same temperature environment, a lower driving torque (driving current Ap) can result in the same rotation speed by increasing the rotation speed (=driving voltage Vd) of the condenser motor 9 to forcibly cool the condenser 4, thereby easing the gas compression by the compressor 2.

Since the required rotation speed of the compressor 2 can be achieved with a lower driving current Ap by increasing the supply voltage Vd of the condenser motor 9 in accordance with the increase in the driving current Ap to increase the rotation speed of the condenser fan 8, an appropriate cooling performance can be obtained without applying an excessive amount of driving current to the compressor motor 3 or exchanging the compressor motor 3 to a larger motor.

According to the present embodiment, under the condition where there is still a margin in the ability of the compressor motor 3 (i.e., when the driving current Ap is lower than the first reference current A1), the condenser motor 9 is either halted or rotated at a low speed. As a result, there is no problem of consuming useless electric by needless rotation of the compressor motor 3.

According to the above-described embodiment, the rotation speed (driving voltage Vd) of the condenser fan 8 is switched among three stages according to the load (driving current Ap) put on the compressor motor 3. Alternatively, the number of stages may be increased or the condenser motor 9 may have a single reference current to simply switch between on and off.

If necessary, dead bands (hysteresis) can be provided for the reference currents to prevent frequent change of rotation speed of the condenser motor 9 due to fluctuation of the driving current Ap occurring near the reference currents.

The electric vehicle air conditioner of the present invention is provided with a condenser fan for cooling a condenser and a motor for driving the condenser fan, and detects the amount of load put on a compressor. When the load is relatively high, the rotation speed of the motor for driving the condenser fan is increased. On the other hand, when the load is low, the rotation speed of the motor for driving the condenser fan is reduced. Thus, increase in the load put on the compressor caused by the increase in the temperature of the gas inside the condenser can be suppressed by the cooling effect of the condenser owing to the rotation of the condenser fan.

Accordingly, a rotation speed of the compressor necessary at a particular time point can be obtained without supplying a high driving current to the motor for driving the compressor or enlarging the size of the same. As a result, problems such as damage caused by an overload put on the motor for driving the compressor, an increase in the production cost caused by employing a large-sized motor, and deterioration of the running performance caused by an excessive electric supply to the motor for driving the compressor are solved, thereby realizing comfort cooling.

Unlike a conventional electric vehicle air conditioner of the same type, the present invention does not cause a problem of rapid decrease in the rotation speed of the compressor motor at a particular time point. Accordingly, discomfort due to sudden decrease in the cooling performance of the air conditioner does not occur.

Since the amount of load put on the compressor is determined by detecting the driving current of the compressor motor, there is no need of providing a special sensor for detecting the load, thereby simplifying the configuration of the air conditioner.

Furthermore, since the rotation speed of the condenser fan is adjusted according to the load put on the compressor, useless electric consumption by needless rotation of the motor for driving the condenser fan can be suppressed.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-271002 (Filed on Sep. 7, 2000) including specification, claims, drawings and summary are incorporated herein by reference in its entirety.

What is claimed is:

1. An air conditioner used in an electric vehicle which cools air by repeating compression and expansion of gas in a circulative manner between a condenser and an evaporator via a compressor driven by a motor, the air conditioner comprising:
   a condenser fan for cooling the condenser;
   a motor for driving the condenser fan;
   a load detector for detecting a load put on the compressor; and
   a rotation speed controller which increases the rotation speed of the motor for driving the condenser fan when the amount of the load detected by the load detector is relatively large, and decreases the rotation speed of the motor for driving the condenser fan when the amount of the load detected by the load detector is relatively small.

2. An air conditioner used in an electric vehicle according to claim 1, wherein the load detector comprises a current detector for detecting a driving current of the motor for driving the compressor, and the rotation speed controller comprises a voltage adjuster for adjusting a voltage supplied to the motor for driving the condenser fan.

3. An air conditioner used in an electric vehicle according to claim 2, wherein the rotation speed controller judges the amount of load put on the compressor based on a reference current for judging the amount of load put on the compressor, and gives a command to the voltage adjuster to output a relatively high voltage when the driving current detected by the current detector is higher than the reference current or to output a relatively low voltage when the driving current detected by the current detector is lower than the reference current.

4. An air conditioner used in an electric vehicle according to claim 3, wherein the rotation speed controller stores a plurality of different reference currents for judging the amount of load put on the compressor and a plurality of output voltages corresponding to current ranges separated by each of the reference currents, and outputs a voltage corresponding to the current range that includes the driving current detected by the current detector.

5. An air conditioner used in an electric vehicle according to claim 1, wherein the rotation speed controller halts the condenser fan when the load put on the condenser is lower than a predetermined value.

6. An air conditioner used in an electric vehicle according to claim 2, wherein the rotation speed controller halts the condenser fan when the load put on the condenser is lower than a predetermined value.

7. An air conditioner used in an electric vehicle according to claim 3, wherein the rotation speed controller halts the condenser fan when the load put on the condenser is lower than a predetermined value.

8. An air conditioner used in an electric vehicle according to claim 4, wherein the rotation speed controller halts the condenser fan when the load put on the condenser is lower than a predetermined value.

* * * * *

UNITED STATES PATENT AND TRADEMARK OFFICE
CERTIFICATE OF CORRECTION

PATENT NO. : 6,418,738 B1
DATED : July 16, 2002
INVENTOR(S) : Y. Yamashita

It is certified that error appears in the above-identified patent and that said Letters Patent is hereby corrected as shown below:

<u>Title page,</u>
Item [57], ABSTRACT,
Line 13, after "compressor" delete "2".
Lines 14 and 15, after "condenser" delete "4".

Signed and Sealed this

Fifteenth Day of April, 2003

JAMES E. ROGAN
*Director of the United States Patent and Trademark Office*